Figure 3:
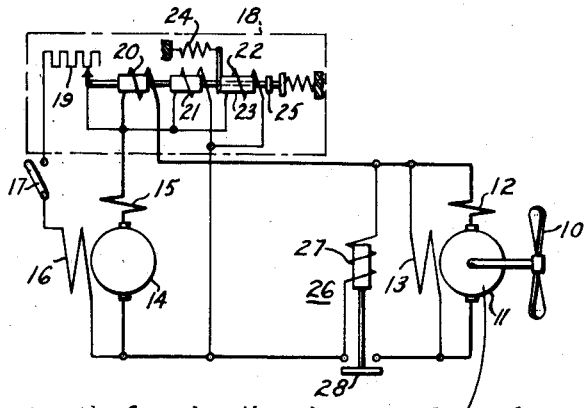

Oct. 28, 1947.    F. W. GODSEY, JR    2,429,716

SUPERCHARGER DRIVE FOR AIRPLANE CABINS

Filed Sept. 15, 1943

Magnetic circuit of motor 11 includes section of reduced area such that the magnetic circuit is saturable and the field flux is approximately proportional to the square root of the applied voltage.

WITNESSES:
Alice R. Howell
7. P. Lyle

INVENTOR
Frank W. Godsey, Jr.
BY O.D. Buchanan
ATTORNEY

Patented Oct. 28, 1947

2,429,716

UNITED STATES PATENT OFFICE 2,429,716

SUPERCHARGER DRIVE FOR AIRPLANE CABINS

Frank W. Godsey, Jr., Wilkinsburg, Pa., assignor to Westinghouse Electric Corporation, East Pittsburgh, Pa., a corporation of Pennsylvania Application September 15, 1943, Serial No. 502,497

8 Claims. (Cl. 230—12)

The present invention relates to a supercharger system for airplane cabins, and more particularly to an electric drive for such a system for driving the supercharger blower at the correct speed at any altitude of the airplane.

Superchargers are used to maintain a desired air pressure within the cabin of an airplane as the altitude and the external air pressure change. Supercharger systems for this purpose consist of a blower for blowing air into the cabin, an electric motor for driving the blower, and control or regulating means for controlling the speed of the blower. Since the external air pressure decreases with increase in altitude, the speed of the blower must increase as the altitude increases in order to maintain the desired air pressure within the cabin. For this reason, the control for the system must function to change the blower speed in response to changes in the altitude or air pressure. The control must be kept as simple and as light in weight as possible, however, because of the space and weight limitations inherent in any aircraft equipment.

The principal object of the present invention is to provide a simple supercharger system for airplane cabins which will automatically cause the supercharger blower to operate at the correct speed at any altitude to maintain the desired pressure within the cabin.

A further object of the invention is to provide a supercharger system for airplane cabins in which the blower is driven by an electric motor of special design, with regulating means for controlling the power input to the motor in such a manner that the blower runs at the correct speed at any altitude, and which also includes means for limiting the speed of the motor to a predetermined maximum.

A more specific object of the invention is to provide a supercharger system using a blower which has different torque requirements at different altitudes, and having an electric motor for driving the blower, and control means, the motor and control means being so designed that the motor has a substantially linear speed-torque characteristic, so that the motor can drive the blower at only one speed at any given altitude, and, in effect, the blower itself functions as a pressure-sensitive device to cause the motor to drive it at the correct speed.

Figure 1:
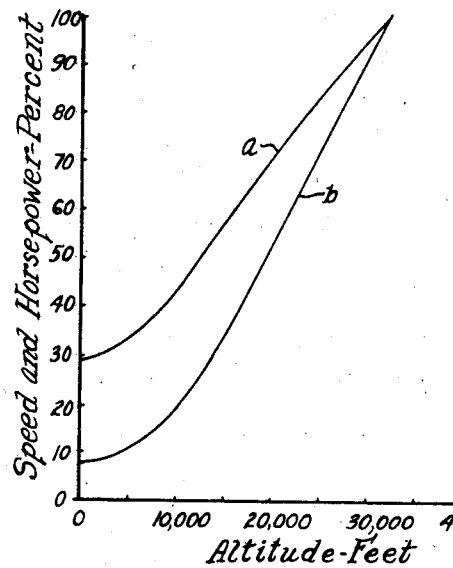
Figure 2:
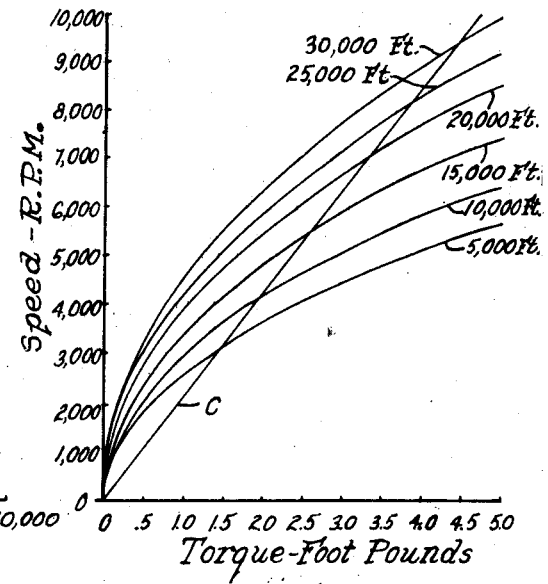

The invention will be more fully understood from the following detailed description, taken in connection with the accompanying drawing, in which:

Figs. 1 and 2 are illustrative curves showing certain characteristics of the supercharger system, and Fig. 3 is a schematic wiring diagram showing a preferred embodiment of the invention.

The supercharger system of the present invention consists essentially of a blower driven by a direct-current electric motor, which is preferably direct-connected to the blower, a variable voltage direct-current generator for supplying the motor, and a regulator for controlling the current input to the motor.

As previously stated, the speed of the blower must change with the altitude of the airplane in order to maintain the desired pressure within the cabin. Fig. 1 shows the speed and horsepower input to the blower as functions of the altitude for a typical supercharger system, curve $a$ being the speed of the blower, and curve $b$ the horsepower input, expressed in per cent of the maximum speed and horsepower, respectively. It will be seen from this figure that the speed of the blower varies approximately in direct proportion to the altitude, except at relatively low altitudes where the performance of the supercharger is of little importance. These curves represent the performance to be obtained, or, in other words, the problem is to provide a simple and reliable control which will cause the blower to operate in the manner shown by these curves.

The torque required to drive either a centrifugal blower or an axial flow blower, varies as the square of the blower speed so long as other conditions remain constant. As the air pressure decreases, however, the torque required to drive the blower at any given speed will also decrease. The blower therefore has different torque requirements at different altitudes. The present invention takes advantage of this fact to provide a very simple control system by using an electric motor to drive the blower, and designing and controlling the motor so that its speed-torque characteristic is such that it can drive the blower at only the one desired speed at any given altitude. In this manner, the blower itself functions as a pressure-sensitive device to control the speed of the motor, since the speed at any altitude is determined by the torque requirements of the blower at that particular altitude.

This operation is further illustrated by the curves of Fig. 2. In this figure, which shows the characteristics of one typical design embodying the invention, the speed and horsepower curves of Fig. 1 have been replotted as a motor speed-torque curve $c$. This figure also shows a family of speed-torque curves for the blower corresponding to different altitudes. It will be observed that the required motor speed-torque curve c is substantially a straight line, and that it intersects each of the blower speed-torque curves at only one point. Therefore, if the motor which drives the blower is designed and controlled so that its speed-torque characteristic is substantially linear, as shown by the curve c, it will drive the blower at the correct speed, and only at that speed, at any altitude, as determined by the intersection of the motor speed-torque curve with the blower speed-torque curve for that particular altitude.

The internal voltage in any direct-current motor is proportional to the field flux and to the speed of rotation of the motor. Since the torque is to be made proportional to the speed, the internal voltage of the motor must be proportional to the field flux and the torque. The torque of a direct-current motor, however, is proportional to the flux and the armature current, so that the internal voltage must be proportional to the armature current and the square of the flux. It will be apparent, therefore, that the desired linear speed-torque relation can be obtained by using a direct-current motor operating at constant current and designed so that the field flux is proportional to the square root of the applied voltage. If such a motor is supplied from a variable voltage source, with a simple regulator to maintain the current supplied to the motor constant, the desired speed-torque characteristic will be obtained and the supercharger system will function in the desired manner.

Since the field flux of the motor is to be a function of the applied voltage, a shunt wound motor must obviously be used, and since the flux is to be proportional to the square root of the applied voltage, the magnetic circuit of the motor must be designed to saturate at a fairly low value of applied voltage. This can be done by reducing the cross-section of magnetic material at some point or points in the magnetic circuit in any suitable manner, such as by placing thin shims of small area under the pole pieces between the pole pieces and the frame, or by punching holes in the pole pieces, or using non-magnetic rivets in the pole pieces, or in any other desired manner. By providing a saturable magnetic field circuit in this way, the magnetization curve of the motor can be made to have sufficient curvature to approach quite closely to the desired function of the voltage.

If the flux is made to vary in exact proportion to the square root of the applied voltage, the desired motor characteristics are obtained by operating it on constant current, as explained above. As a practical matter, however, it is not always possible to give the magnetization curve exactly the desired shape, and equally satisfactory results are obtainable if the field flux is not exactly proportional to the square root of the applied voltage, since, if the magnetization curve approaches the desired function within reasonable limits, the desired motor characteristic can be obtained by introducing a suitable variation in the current to compensate for the departure of the magnetization curve from the theoretically correct shape.

Thus, in one actual embodiment of the invention, the motor design was such that the magnetization curve did not exactly follow the theoretically desirable square root function of the voltage, but was actually represented by the relation $$\phi = \frac{V}{0.1 + 0.004V}$$

where $\phi$ is the field flux and V is the applied voltage. This function is not the desired square root function of the voltage, but approaches it sufficiently closely to permit the desired speed-torque characteristic to be obtained. The current required in any such case may readily be determined from the voltage and flux relations discussed above, and in this particular case the current I is found to be $I = 105 + 1.2V$.

It will be clear therefore that even though the magnetization curve of the motor departs somewhat from the desired proportionality of flux to the square root of the applied voltage, the desired motor characteristics are obtainable by slightly varying the current to compensate for the departure of the magnetization curve from the desired shape. It is to be understood, therefore, that where the field flux is referred to in the specification and claims as being approximately proportional to the square root of the applied voltage, and where the current is referred to as being approximately constant, these expressions are intended to include those cases in which the magnetization curve approaches the desired function, although it may not have the desired proportionality in all parts of the curve, and in which the current is varied somewhat from a constant value to compensate for the departure of the magnetization curve from the theoretically required shape. In general, as shown by the current equation given above, the current necessary to produce the desired speed-torque characteristics of the motor will consist of a relatively large constant component and a relatively much smaller component which is proportional to the applied voltage. The input current to the motor can be controlled to give this slight variation in almost as simple a manner as constant current control would permit.

An illustrative embodiment of the invention is shown in Fig. 3. In this figure, the supercharger blower 10 is driven by a direct-current shunt-wound motor 11 which is preferably direct-connected to the blower 10. The motor 11 has a compensating winding 12, to prevent distortion of the flux at low voltages, and has a shunt field winding 13.

The motor 11 is supplied from a variable voltage direct-current generator 14 which is preferably driven direct from the airplane engine, so as to be independent of the electrical system of the airplane, although it may be driven by any other suitable prime mover. The generator 14 has a compensating winding 15 to prevent distortion of its field flux, and has a shunt field winding 16. A switch 17 may be provided in the generator field circuit for starting and stopping the operation of the system.

The current supplied to the motor 11 from the variable voltage generator 14 is controlled by a regulator 18 which controls the voltage of the generator 14 to supply the desired value of current to the motor 11. The regulator 18 may be of any desired type, and has been shown diagrammatically as including a variable resistance 19 connected in series with the generator field winding 16. The resistance 19 is controlled by a regulator current coil 20, which is connected in series between the generator 15 and the motor 11 so as to carry the motor current. If the motor is designed so that its field flux is exactly proportional to the square root of the applied voltage, the desired operation of the system will be obtained if the motor is supplied with constant current, as explained above, and the regulator can include only the current coil 20, which will adjust the variable resistance 19 to control the voltage of the generator 14 so as to maintain constant current at all times.

As previously explained, however, in actual practice, it is not always possible to obtain exactly the desired relation of the motor flux to applied voltage, and when the magnetization curve approaches but does not coincide with the theoretically desired curve, a slight variation of current must be provided to obtain the desired performance. Since the required current will consist of a constant component and a relatively small component proportional to the voltage, the desired current regulation is easily effected by providing in the regulator 18 a voltage coil 21 which is connected, as shown, across the generator voltage. The coil 21 may either oppose the coil 20 or add to its effect, depending upon the particular conditions, and it preferably operates on the armature of the voltage regulator 18 in the same manner as the coil 20, so that the resultant effect is to control the current supplied to the motor according to a relation such as that given above for one particular motor design.

Since the motor is direct-connected to the blower 10, failure of the mechanical coupling might cause dangerous overspeeding of the motor, and operation of the system at a higher altitude than the maximum altitude for which it is intended may also cause dangerous overspeeding, since in either case the regulator would tend to increase the generator voltage to its maximum value and thus the speed of the motor would be increased to dangerous values. In order to prevent this, an auxiliary voltage coil 22 may be provided on the regulator 18 and connected across the generator voltage in parallel with the coil 21. The voltage coil 22 preferably operates on an auxiliary armature 23 of the voltage regulator, which is normally held in inoperative position by a tension spring 24. When the generator voltage exceeds a predetermined value, the coil 22 moves the armature 23 against a shoulder 25 on the main armature and actuates the regulator to reduce the generator voltage. Since the regulator limits the maximum voltage which may be supplied by the generator 14 in this way, it also limits the maximum speed which the motor 11 can reach, and thus prevents dangerous overspeeding in case of loss of load on the motor or operation at a higher altitude than the system is designed for.

The system is preferably started in operation by means of the switch 17 in the generator field circuit. It would be desirable for reasons of simplicity to have the motor 11 solidly connected to the generator 14 at all times. When the motor is at rest, however, it has very low resistance and the generator 15 would not build up its voltage with this low resistance load across its terminals, in effect short-circuiting them. A starting contactor 26 is provided, therefore, to disconnect the motor 11 from the generator when the generator voltage is below a predetermined minimum. The contactor 26 has an operating coil 27 connected across the generator voltage and a contact 28 connected in the motor armature circuit. When the generator and motor are at rest, the contactor 26 is, of course, open. When the generator is started, the contactor remains open until the generator voltage has built up to the value for which the contactor 26 is set, which is made high enough to insure that the generator will build up its voltage, and at this point the contactor 26 closes its contact 28 to connect the motor to the generator. When the contactor closes, the current inrush to the motor 11 will usually cause the regulator 18 to reduce the generator voltage in order to bring the motor current down to its regulated value. This drop in generator voltage will cause the contactor 26 to drop out momentarily, and it will reclose its contact as the generator voltage again increases. This process may occur once or several times while the blower is coming up to speed, since the effect of the regulator 18 is to limit the motor starting current to the value for which the regulator is adjusted. This cycling operation of the contactor 26, however, has no harmful effect since the power is very low during starting, and its only effect is to somewhat prolong the time required for the blower to come up to speed, but this is not undesirable since the operation of the supercharger system at low altitudes is not important.

The operation of this system will be evident from the foregoing description. The motor 11 is designed in the manner described so that its field flux is a nonlinear function of the applied voltage which approaches proportionality to the square root of the voltage to as close a degree as is practically possible. The voltage regulator 18 controls the current to the motor 11 to an approximately constant value, the voltage coil 21 of the regulator introducing sufficient variation in the current to compensate for the departure of the actual magnetization curve of the motor from the theoretically desired shape. The speed-torque characteristic of the motor is, therefore, substantially a straight line, corresponding to the curve $c$ of Fig. 2, and since the torque requirements of the blower 10 are different at different altitudes, as shown by the family of blower speed-torque curves of Fig. 2, the motor can drive the blower at one, and only one, speed at any given altitude. As the altitude of the airplane increases the speed of the blower will also increase, the operating points of the system being represented by the intersections of the curve $c$ with the blower curves in Fig. 2. The voltage regulator 18 increases the voltage of the generator 14 as the blower speed increases, so that the power input to the motor is increased while the current is kept constant or approximately constant. Thus, in effect, the blower 10 itself acts as a pressure-sensitive device to control the operation of the system, since its torque requirements at any given altitude, in connection with the speed-torque characteristic of the motor, determine the speed at which the blower is driven at that altitude. In this way, a very simple and reliable supercharger drive is provided which automatically drives the blower at the correct speed at any altitude. The drive system can be made quite light because of its simplicity, since it consists only of the generator, the motor and the voltage regulator 18. The regulator can be of any desired type which will perform the required functions, and can be made relatively small.

It will be apparent that the invention is capable of various modifications and embodiments, and it is to be understood therefore that although a specific embodiment has been shown and described for the purpose of illustration, the invention is not limited to this particular arrangement, but in its broadest aspects it includes all equivalent embodiments and modifications which come within the scope of the appended claims.

I claim as my invention:

1. In a supercharger system for an airplane cabin, a blower for supplying air to the cabin to maintain an approximately constant pressure therein, said blower having different torque requirements at different altitudes, and drive means for said blower, said drive means comprising a shunt-wound direct-current electric motor in which the field flux is approximately proportional to the square root of the applied voltage, a variable voltage source of direct current for said motor, and regulating means for controlling the current supplied to the motor to maintain said current approximately constant to cause the motor to have a substantially linear speed-torque characteristic.

2. In a supercharger system for an airplane cabin, a blower for supplying air to the cabin to maintain an approximately constant pressure therein, said blower having different torque requirements at different altitudes, and drive means for said blower, said drive means comprising a shunt-wound direct-current electric motor in which the field flux is approximately proportional to the square root of the applied voltage, a variable voltage source of direct current for said motor, regulating means for controlling the current supplied to the motor to maintain said current approximately constant to cause the motor to have a substantially linear speed-torque characteristic, and means for preventing the speed of the motor from exceeding a predetermined maximum.

3. An electric drive system for a blower, said drive system comprising a shunt-wound direct-current electric motor for driving the blower, said motor having a saturable magnetic field circuit such that the field flux is a nonlinear function of the applied voltage which approaches proportionality to the square root of the applied voltage, a variable voltage source of direct current for said motor, and regulating means for controlling the current supplied to the motor so that said current has a substantially constant component and a relatively smaller component which is proportional to the voltage of said source.

4. An electric drive system for a blower, said drive system comprising a shunt-wound direct-current electric motor for driving the blower, said motor having a saturable magnetic field circuit such that the field flux is a nonlinear function of the applied voltage which approaches proportionality to the square root of the applied voltage, a variable voltage source of direct current for said motor, regulating means for controlling the current supplied to the motor so that said current has a substantially constant component and a relatively smaller component which is proportional to the voltage of said source, and means for limiting the speed of the motor to a predetermined maximum.

5. An electric drive system for a blower, said drive system comprising a shunt-wound direct-current electric motor for driving the blower, said motor having a magnetic field circuit including a section of reduced cross-sectional area such that the magnetic circuit is saturable and the field flux is approximately proportional to the square root of the applied voltage, a variable voltage direct-current generator for supplying current to said motor, and regulating means for controlling the voltage of said generator to maintain the current supplied to the motor approximately constant.

6. An electric drive system for a blower, said drive system comprising a shunt-wound direct-current electric motor for driving the blower, said motor having a magnetic field circuit including a section of reduced cross-sectional area such that the magnetic circuit is saturable and the field flux is approximately proportional to the square root of the applied voltage, a variable voltage direct-current generator for supplying current to said motor, regulating means for controlling the voltage of said generator to maintain the current supplied to the motor approximately constant, and means for preventing the voltage of said generator from exceeding a predetermined maximum.

7. An electric drive system for a blower, said drive system comprising a shunt-wound direct-current electric motor for driving the blower, said motor having a magnetic field circuit including a section of reduced cross-sectional area such that the magnetic circuit is saturable and the field flux is a nonlinear function of the applied voltage which approaches proportionality to the square root of the applied voltage, a variable voltage direct-current generator for supplying current to said motor, and regulating means for controlling the voltage of said generator so that the current supplied to the motor has a substantially constant component and a relatively smaller component which is proportional to the voltage of the generator.

8. An electric drive system for a blower, said drive system comprising a shunt-wound direct-current electric motor for driving the blower, said motor having a magnetic field circuit including a section of reduced cross-sectional area such that the magnetic circuit is saturable and the field flux is a nonlinear function of the applied voltage which approaches proportionality to the square root of the applied voltage, a variable voltage direct-current generator for supplying current to said motor, regulating means for controlling the voltage of said generator so that the current supplied to the motor has a substantially constant component and a relatively smaller component which is proportional to the voltage of the generator, and means for preventing the voltage of the generator from exceeding a predetermined maximum.

FRANK W. GODSEY, Jr.

REFERENCES CITED

The following references are of record in the file of this patent:

UNITED STATES PATENTS

| Number | Name | Date |
|---|---|---|
| 1,930,513 | Eames | Oct. 17, 1933 |
| 2,306,277 | Oswald | Dec. 22, 1942 |
| 2,281,987 | Oswald | May 5, 1942 |
| 2,106,237 | Bush | Jan. 25, 1938 |
| 2,217,364 | Halford et al. | Oct. 8, 1940 |

FOREIGN PATENTS

| Number | Country | Date |
|---|---|---|
| 211,060 | Switzerland | 1940 |